Oct. 13, 1953

C. E. ADAMS ET AL 2,654,975

REDUCING VALVE

Filed July 23, 1948

INVENTORS
CECIL E. ADAMS
ELLIS H. BORN
BY
Herschel C. Omohundro
attorney

Patented Oct. 13, 1953

2,654,975

UNITED STATES PATENT OFFICE 2,654,975

REDUCING VALVE

Cecil E. Adams and Ellis H. Born, Columbus, Ohio, assignors to The Denison Engineering Company, Columbus, Ohio, a corporation of Ohio Application July 23, 1948, Serial No. 40,376

7 Claims. (Cl. 50—11)

This invention relates generally to hydraulic apparatus and is particularly directed to an improvement in pressure reducing valves. This type of valve mechanism is employed in hydraulic systems wherein a source of fluid at high pressure is provided and one or more mechanisms operated by fluid at a substantially reduced pressure.

One of the objects of the present invention is to provide a pressure reducing valve which is particularly adaptable for use in connection with accumulator or storage type systems due to the fact that when no fluid is being withdrawn from the secondary section of the hydraulic system no flow of fluid through the pressure reducing valve is required to maintain the desired pressure.

Another object of the invention is to provide a pressure reducing valve in which a valve element is moved in response to a pressure differential caused by fluid flow through an orifice, the valve being caused to move toward an open position by fluid flow and toward a closed position when fluid flow is discontinued.

A further object of the invention is to provide a pressure reducing valve having a flow controlling element disposed in a main fluid passage, this flow controlling element being responsive to a pressure differential caused by an orifice disposed in a second fluid passage which by-passes the flow controlling element arranged in the first fluid passage.

A still further object of the invention is to provide a pressure reducing valve of the type mentioned in the preceding paragraph with valve means responsive to the pressure in the main fluid passage, at the outlet side of the flow controlling element, to control fluid flow through the second or by-pass passage, this valve being normally open to permit fluid flow through the by-pass passage and closed when the pressure in the outlet portion of the line increases beyond a predetermined degree.

It is also a further object of the invention to provide the valve means in the by-pass passage mentioned in the preceding paragraph and to so construct the valve that the pressure cannot unduly increase in the outlet portion of the main fluid passage, due to the accumulation of leakage into the secondary portion of a system served by the pressure reducing valve mechanism.

A further object of the invention is to provide a pressure reducing valve mechanism having a body with a main flow passage, a valve element for controlling fluid flow through the main flow passage, a secondary passage extending around the valve, an orifice in the secondary passage, the orifice being so arranged that pressure differentials caused thereby, will be applied to the valve to effect its operation, a normally open valve being provided in the secondary passage, which normally open valve is responsive to fluid pressure in the outlet end of the main flow passage to move to a position wherein fluid flow through the secondary fluid passage will be discontinued, the valve also being movable in response to pressure increases in the outlet end of the main flow passage due to leakage of pressure fluid past the main valve in a position to establish communication between the outlet end of the main flow passage and the exhaust whereby such leakage will be dissipated to the exhaust rather than accumulated in the secondary portion of the system.

Further objects and advantages of the present invention will be apparent from the following description, reference being had to the accompanying drawings wherein a preferred form of embodiment of the invention is clearly shown.

Figures 1, 2:
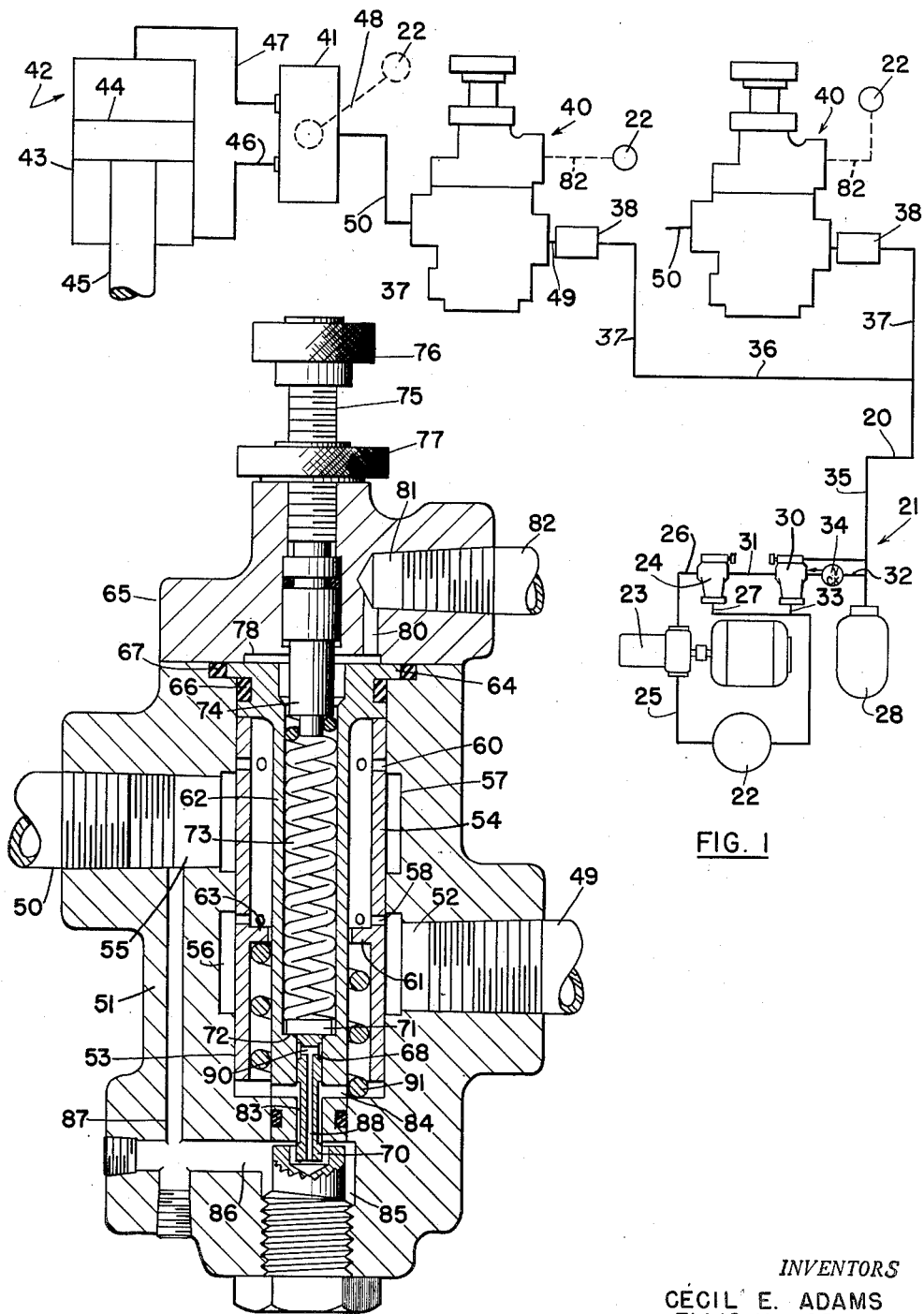
Fig. 1 is a diagrammatic view of a hydraulic system in which one or more pressure reducing valve mechanisms formed in accordance with the present invention have been incorporated.
Fig. 2 is a vertical longitudinal sectional view taken through a pressure reducing valve mechanism formed in accordance with the present invention.

Referring more particularly to the drawing, the numeral 20 designates a hydraulic system selected for the purpose of illustration. This system includes a pressure source 21, having a fluid reservoir 22, a motor driven pump 23 and a relief valve 24, the tank, pump and pressure reducing valve being connected by fluid conductors 25, 26 and 27 in the conventional manner. The pressure source shown herein is of the storage type, having an accumulator 28 and an unloading valve 30, by which the continually operating pump 23 is unloaded after previously selected pressures have been generated. Fluid line 31 extends from the relief valve 24 to the unloader valve 30, and a line 32 extends from the latter valve to the accumulator, a third line 33 extending from the unloader back to the reservoir 22 to convey the pump delivery to the reservoir when the pump is being unloaded. Line 32 is provided with a check valve 34 to prevent the unloading of the accumulator, when the lines 31 and 33 are connected, due to the operation of valve 30. Accumulator 28 may be of any desirable type and is merely indicated diagrammatically in the drawing. A branch line 35 is connected with the line 32 between the check valve 34 and the accumulator 28. This line leads to a manifold line 36 with which are connected system branches generally designated by the numeral 37.

Each branch 37 includes a flow control valve 38, which may be of the type shown in the copending application of Cecil E. Adams, Serial No. 774,837 filed September 18, 1947, or, any other suitable type, a pressure reducing valve forming the subject matter of the present invention and a control valve mechanism 41, which may be a conventional four-way valve or one of many types used to control the operation of a fluid motor, diagrammatically illustrated at 42. In this instance, the fluid motor includes a cylinder 43 and a piston 44, the latter having a ram or similar device 45 projecting therefrom. Combination inlet and outlet lines 46 and 47 lead from the control valve mechanism 41 to the bottom and top ends of the cylinder 43. An exhaust line 48 leads from the four-way valve 41 to the reservoir 22.

In the general operation of the hydraulic system the pump is continuously driven to charge the accumulator 28 with fluid to the desired pressure. When this pressure is reached the unloader valve operates to connect the pump discharge with the reservoir 22, permitting the pump to operate with no appreciable load. Fluid from the accumulator flows through lines 35 and 36 to the various branches 37 of the system. The flow control valve 38 regulates the rate at which the fluid may flow from the manifold section 36 to the branches 37, the fluid flowing through the pressure reducing valve 40 to be lowered to the desired operating pressure. This fluid flows from the pressure reducing valves through lines 50 to the control valve mechanism 41 where it is alternately directed to the opposite ends of the cylinders 43 to effect the reciprocation of the pistons 44. The valves 41 when connecting one end of the cylinders with the inlet lines 50 also connect the opposite ends thereof to the outlet 48 so that fluid exhausted by the movement of the pistons 44 will be directed to the reservoir 22. In general the hydraulic system is conventional and no claim thereto is made in this application.

The pressure reducing valve mechanism 40 is illustrated in vertical longitudinal section in Fig. 2. This valve mechanism includes a body casing 51, having an inlet port 52, which is connected with the flow control valve 38 by the line 49. The body 51 also includes an internal chamber 53 for the slidable reception of a valve element 54. The body is further provided with an outlet port 55 with which the line 50 is connected. Annular recesses 56 and 57 are provided in the body in registration with the inlet and outlet ports 52 and 55, respectively, the ports 52 and 55, the bore 53 and the recesses 56 and 57 forming main fluid flow passage through the casing 51. Fluid flow through this passage is controlled by the valve element 54 which in this present instance, is of sleeve-like configuration and has a set of ports 58 continuously registering with the inlet recess 56. The sleeve 54 is also provided with a row of ports 60 which are caused to establish communication between the interior of the sleeve and the outlet recess 57 upon proper movement of the sleeve.

The sleeve is further provided with an annular internal flange 61 disposed immediately below the row of ports 58. This flange provides an intermediate transverse web in the sleeve which web has a central opening. This opening is of such size as to have its peripheral wall spaced slightly from the outer wall of a tube 62 which projects axially through the sleeve 54. The clearance between the edge of the opening in the flange 61 and the outer surface of the tube forming an annular orifice designated by the numeral 63. The purpose of this orifice will be set forth hereinafter.

Tube 62 has a flanged upper portion which closely fits the interior of the chamber 53 and provides an annular lip 64, which is gripped between the upper surface of the body 51 and a cap 65 suitably secured thereto. The head of the tube is provided with an annular groove for the reception of an O ring seal 66, a similar seal 67 being disposed around the lip 64. The lower end of the tube 62 has the opening therein reduced as at 68 to slidably receive a pressure responsive valve 70, this valve having a head 71 at its upper end, which engages a shoulder 72 formed by the reduction of the diameter of the central opening in the tube to limit the movement of the piston valve in the tube. This head 71 is engaged by a coil spring 73, which also engages a spring adapter 74 which is guided for movement in the cap 65; this adapter is engaged by an adjusting screw 75 which has knurled head 76 and is provided with a knurled nut 77 to maintain its position of adjustments.

The under surface of the cap 65 has a recess 78 formed therein, which recess communicates with the hollow interior of the tube 62, an opening 80 leading from the recess 78 to the inner end of a threaded opening 81, which receives the end of a pipe line 82 extending to the reservoir 22. The piston valve 70 has an external annular groove 83 formed therein to establish communication between transverse ports 84 formed in the tube 62 and a reduced chamber 85 formed at the lower end of the casing 51. This chamber 85 is connected by drilled holes 86 and 87 with the outlet port 55, the ports 58 in the sleeve 54, the lower part of bore 53, the ports 84, groove 83 and chamber 85 plus the openings 86 and 87 forming a by-pass or secondary passage which connects the inlet port 52 with the outlet port 55 and extends around the valve produced by the row of ports 60 and the shoulder at the upper end of the recess 57. This secondary passage is open to provide fluid flow as long as the head 71 of the valve 70 is in engagement with the shoulder 72, the spring 73 normally maintaining this position of the valve 70.

Valve 70 is formed with a central longitudinal opening 88 which terminates adjacent the head 71 in transversely extending ports 90. These ports are arranged to communicate with the enlarged portion of the central opening in the tube 62 after the valve 70 is moved in opposition to the spring 73 a distance sufficient to interrupt fluid flow through the secondary passage. The sleeve 54 is normally urged toward the position shown in Fig. 2, wherein fluid flow in the main passage is interrupted, by a coil spring 91 disposed between the flange 61 and the inner end wall of the chamber 53. When the sleeve is in this position the ports 60 are not in registration with the outlet recess 57 and communication between the interior of the sleeve 53 and the recess 57 is prevented.

In the operation of the pressure reducing valve mechanism, fluid is supplied through the line 49 to the inlet recess 56. This fluid flows through port 58 to the interior of the sleeve 54 above the flange 61. This fluid cannot flow through the main passage since ports 60 are not in registration with recess 57; due to the orifice 63, however, fluid will flow through the secondary passage, the orifice causing a drop in pressure between the upper and lower sides of the flange 61. It will be obvious, since the pressure above flange 61 is higher than the pressure below this flange, there will be a force tending to move the sleeve 54 downward in opposition to the force of the spring 91. If the pressure differential caused by the orifice is of sufficient magnitude, the sleeve 54 will be moved downwardly until communication is established between the upper ports 60 thereof and the outlet recess 57, at which time fluid may then flow from the inlet pipe 49 to the outlet pipe 50 for use in operating the motor 42. As this fluid flow takes place the pressure in the outlet port 55 will increase this pressure being transmitted through passages 87 and 86 to the reduced chamber 85 at the lower end of the valve 70, and being applied to the end of the valve. When this pressure increases sufficiently to compress spring 73, the valve 70 will close interrupting communication through the secondary passage and consequently eliminating the pressure differential caused by the orifice 63. This disappearance of the pressure differential permits spring 91 to move the sleeve 54 in an upward direction until communication through the openings 60 is discontinued.

By adjusting the tension of spring 73 through the operation of the knurled knob 76, the pressure in the outlet port 55 may be varied. It should be obvious that if the tension of spring 73 is increased the pressure of the fluid in outlet port will also be increased, the mechanism functioning to maintain such pressure.

In the use of the hydraulic motor 42, or other device in the secondary portion of the hydraulic system there may be sustained periods when no fluid is being used. During such periods, leakage of fluid past the pressure reducing valve will cause the pressure to increase excessively in the secondary portion of the system unless relieved. To avoid this excessive pressure the communicating passages 88 and 90 have been provided in the valve 70. When the pressure in the outlet port 55 reaches a predetermined value, valve 70 will be moved in opposition to spring 73 to a position in which the ports 90 establish communication between the chamber 85 and the interior of the tube 62, which is in turn in communication with the reservoir 22. The accumulated leakage will thus be dissipated before objectionable pressures can be reached in the outlet port, or, the lines connecting therewith. It will be obvious that as soon as pressure in the outlet port 55 is reduced to a predetermined degree, spring 73 will again move the valve 70 to a position wherein fluid flow through the secondary passage will be established, a pressure drop will occur and the sleeve valve 54 will again be moved to establish fluid flow through the main passage of the valve. It will be noted from the foregoing that flow through the valve is initiated by a flow through the secondary passage and that the increase in pressure in the outlet or low pressure side of the reducing valve interrupts fluid flow through the secondary fluid passage, which in turn causes the pressure to equalize on opposite sides of the orifice and permits the main valve to be moved to a closed position.

While the form of embodiment of the present invention as herein disclosed constitutes a preferred form, it is to be understood that other forms might be adopted, all coming within the scope of the claims which follow.

We claim:

1. A pressure reducing valve mechanism comprising a casing having inlet, outlet and exhaust ports, said inlet and outlet ports being connected to form a main flow passage; a valve element in said casing to control fluid flow through said passage; a secondary passage extending between said inlet and outlet ports and around said valve; means in said secondary passage forming an orifice, fluid flow through said secondary passage producing a pressure differential on opposite sides of said orifice, the greater pressure being employed to move said valve element toward an open position; a second valve element disposed in said secondary passage to control fluid flow therethrough; stationary stop means engaged by said second valve, said second valve being in secondary passage opening position when engaged with said stop means; and means yieldably holding said second valve in engagement with said stop means to permit fluid flow through said secondary passage, said second valve element being responsive to a predetermined increase in pressure in said outlet port to move away from said stop means to a second position to interrupt fluid flow through said secondary passage, said second valve having a passage establishing communication between said outlet and exhaust ports when in said second position.

2. A pressure reducing valve mechanism comprising a casing having a central bore and inlet and outlet ports communicating therewith at spaced points and an exhaust port; a sleeve valve disposed in said bore to control direct communication between said inlet and outlet ports; resilient means normally urging said sleeve valve toward a position to prevent communication between said inlet and outlet ports; means forming a restricted passage for establishing indirect communication between said inlet and outlet ports; means cooperating with said sleeve valve to form an orifice in said restricted passage, fluid flow through said orifice creating a pressure differential at opposite sides thereof, the higher pressure of said differential being applied to said sleeve valve to move the same in opposition to said resilient means to establish direct communication between said inlet and outlet ports; means forming an exhaust passage communicating with said exhaust port and said restricted passage; a second valve element disposed for movement to alternately connect the restricted and exhaust passages with said outlet port; and resilient means normally urging said second valve toward a position to maintain communication between said restricted passage and said outlet port, a predetermined increase in pressure in said outlet port serving to move said second valve in opposition to its resilient means to interrupt communication between said restricted passage and said outlet port, a further increase in pressure in said outlet port serving to move said second valve to establish communication between said exhaust passage and said outlet port.

3. A pressure reducing valve mechanism comprising a casing having a central bore and inlet and outlet ports communicating therewith at spaced points; a sleeve valve with an internal annular rib disposed for movement in said bore to control direct communication between said inlet and outlet ports; resilient means normally urging said sleeve valve toward a position to prevent direct communication between said inlet and outlet ports; a member extending through said sleeve valve and cooperating with said rib and said casing to form a passage with an orifice establishing restricted communication between said inlet and outlet ports independent of the communication controlled by said sleeve valve, fluid flow through said passage creating a pressure drop across said orifice, the higher pressure being applied to said sleeve valve to move it toward open position in opposition to said resilient means; a normally open second valve in said passage, said second valve being responsive to fluid pressure in said outlet port to move toward a closed position; and spring means yieldably resisting the movement of said second valve toward a closed position by fluid pressure in said outlet port.

4. A pressure reducing valve mechanism comprising a casing having a central bore and inlet and outlet ports communicating therewith at spaced points and an exhaust port; a sleeve valve with an internal annular rib disposed for movement in said bore to control direct communication between said inlet and outlet ports; resilient means normally urging said sleeve valve toward a position to prevent direct communication between said inlet and outlet ports; a tubular member extending through said sleeve valve and cooperating with said rib and said casing to form a passage with an orifice establishing restricted communication between said inlet and outlet ports independently of said sleeve valve, fluid flow through said passage creating a pressure drop across said orifice, the higher pressure thereof being applied to said sleeve valve to move it in opposition to said resilient means, said tubular member having a second passage establishing communication between the first-mentioned passage and said exhaust port; a spool valve element disposed for movement in said tubular member to control fluid flow through said first and second mentioned passages; and spring means normally urging said valve element toward a position to permit fluid flow through the first-mentioned passage, a predetermined increase in pressure in said outlet port serving to move said spool valve element in opposition to said spring means to a position to interrupt fluid flow through said first-mentioned passage; a further increase in outlet port pressure serving to move said valve element to a position to establish fluid flow from said outlet to said exhaust port through said second passage.

5. A pressure reducing valve mechanism comprising a casing having an internal chamber and inlet, outlet and exhaust ports communicating therewith at spaced points, said chamber having a reduced extension and said casing having a passage extending from said outlet port to said chamber extension; a sleeve valve disposed for limited movement in said chamber to control direct communication between said inlet and outlet ports, said sleeve valve having a ported wall extending transversely therein; spring means between said wall and the end of said chamber, said spring urging said sleeve valve to a position to prevent direct communication between said inlet and outlet ports; a tubular member extending through said sleeve valve and into said chamber extension, said member projecting through said ported wall and being spaced therefrom to provide an orifice, said tubular member having ports establishing communication between said chamber, said casing passage and said outlet port; a valve element disposed for movement in said tubular member between a first position establishing communication between said casing passage and said inlet port and a second position establishing communication between said casing passage and said exhaust port; and a second spring means engaging said valve element to normally maintain the same in said first position, said valve element being responsive to increasing fluid pressure in said outlet port to move in opposition to said second spring means to a position interrupting communication between said casing passage and said inlet port and establishing communication between said casing passage and said exhaust port.

6. A pressure reducing valve mechanism comprising a casing having an internal chamber and inlet, outlet and exhaust ports communicating therewith at spaced points, said chamber having a reduced extension and said casing having a passage extending from said outlet port to said chamber extension; a sleeve valve disposed for limited movement in said chamber to control direct communication between said inlet and outlet ports, said sleeve valve having a ported wall extending transversely therein; spring means between said wall and the end of said chamber, said spring urging said sleeve valve to a position to prevent direct communication between said inlet and outlet ports; a tubular member extending through said sleeve valve and into said chamber extension, said member projecting through said ported wall and being spaced therefrom to provide an orifice, said tubular member having a reduced internal diameter at one end and ports establishing communication between said chamber and said casing passage, the interior of said tubular member being in communication with said exhaust port; a spool valve element disposed for movement in the reduced internal diameter of said tubular member; a second spring means tending to urge said spool valve element toward a position establishing communication between said casing passage and the ports in said tubular member, said spool valve element being responsive to fluid pressure in said outlet port to move in opposition to said second spring means to a position obstructing communication between said casing passage and the ports in said tubular member, said spool valve element having a passage operative in one position of said element to establish communication between said casing passage and the interior of said tubular member.

7. A pressure reducing valve mechanism comprising a casing having inlet, outlet and exhaust ports, said inlet and outlet ports being connected to form a main flow passage; a valve element in said casing to control fluid flow through said passage; a secondary passage extending between said inlet and outlet ports and around said valve; means in said secondary passage forming an orifice, fluid flow through said secondary passage producing a pressure differential on opposite sides of said orifice, the greater pressure being employed to move said valve element toward an open position; a second valve element disposed in said secondary passage to control fluid flow therethrough, said second valve having a passage formed therein to establish communication between said outlet and exhaust ports; fixed stop means engaged by said second valve, said second valve being in position to permit communication between said inlet and outlet ports through said secondary passage and prevent communication between said outlet and exhaust ports through the passage in said second valve when in engagement with said stop means; and spring means normally urging said second valve into engagement with said stop means, predetermined increase in pressure in said outlet port serving to move said second valve away from said stop means to a position to interrupt communication between said inlet and outlet port through said secondary passage and establish communication between said outlet and exhaust ports.

CECIL E. ADAMS.
ELLIS H. BORN.

References Cited in the file of this patent

UNITED STATES PATENTS

| Number | Name | Date |
|---|---|---|
| 527,902 | Taafel | Oct. 23, 1894 |
| 939,752 | Smith | Nov. 9, 1909 |
| 953,403 | Turner | Mar. 29, 1910 |
| 1,633,728 | Farmer | June 29, 1926 |
| 1,709,904 | Farmer | Apr. 23, 1929 |
| 1,733,183 | Dean | Oct. 29, 1929 |
| 2,225,916 | Maglott | Dec. 24, 1940 |
| 2,357,318 | Donaldson | Sept. 5, 1944 |